United States Patent [19]

Meyn

[11] 4,300,644
[45] Nov. 17, 1981

[54] APPARATUS FOR WEIGHING FOWL

[76] Inventor: Pieter Meyn, 68 Noordeinde, 1510 AA Oostzaan, Netherlands

[21] Appl. No.: 53,747

[22] Filed: Jul. 2, 1979

[30] Foreign Application Priority Data

Jul. 5, 1978 [EP] European Pat. Off. ......... 78200082.2

[51] Int. Cl.³ .................... G01G 19/00; G01G 13/00; G01G 21/22
[52] U.S. Cl. ...................................... 177/145; 177/54; 177/163
[58] Field of Search .................... 177/52, 54, 145, 163, 177/1; 198/504; 209/592, 593

[56] References Cited

U.S. PATENT DOCUMENTS

| 3,339,651 | 9/1967 | Garnett | 177/55 |
| 3,642,130 | 2/1972 | Altenpohl | 209/592 |
| 3,918,587 | 11/1975 | Drew, Jr. | 209/593 |
| 3,997,013 | 12/1976 | Brook | 209/593 |
| 4,062,414 | 12/1977 | Cook | 177/145 |
| 4,081,045 | 3/1978 | Harris | 177/163 |

FOREIGN PATENT DOCUMENTS

| 1032214 | 6/1966 | United Kingdom | 177/52 |
| 612864 | 2/1976 | U.S.S.R. | 177/163 |

Primary Examiner—George H. Miller, Jr.
Attorney, Agent, or Firm—Bailey, Dority & Flint

[57] ABSTRACT

Apparatus for weighing fowl hanging from shackles of a continuously moving overhead conveyor, having a plurality of balance arms extending radially outwards from the vertical central axis of the apparatus and being pivotably supported by slide blocks mounted on vertical guide bars rotating about the central axis and driven by the overhead conveyor. The outer ends of the balance arms are adapted, while moving along with the conveyor at the same speed, to catch and lift the shackles so that they are no longer connected with the conveyor, by moving the slide blocks upwards, and the inner ends of the balance arms are adapted to come to bear on a load cell located in the central axis when released by a locking member.

6 Claims, 7 Drawing Figures

U.S. Patent
Nov. 17, 1981
4,300,644
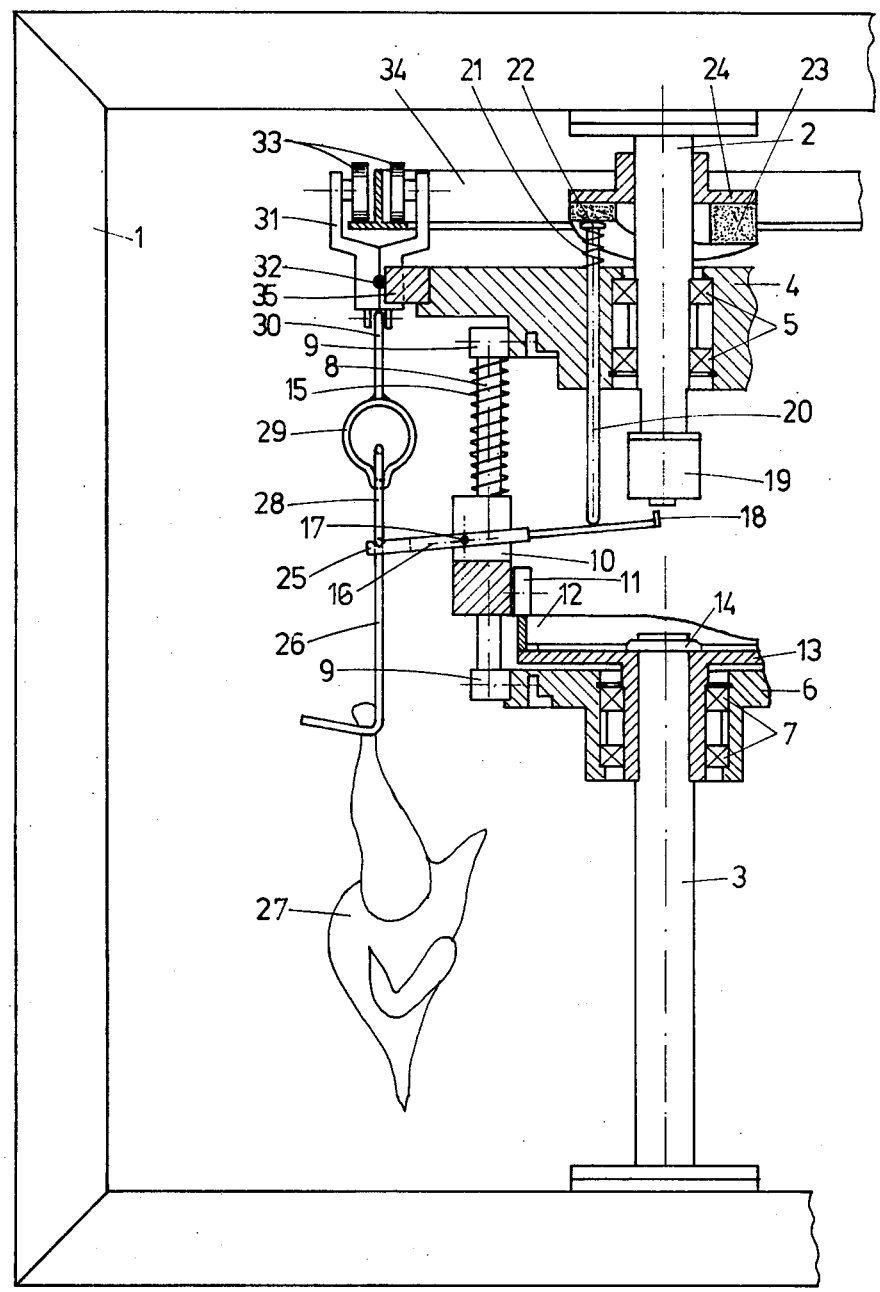

APPARATUS FOR WEIGHING FOWL

BACKGROUND OF THE INVENTION

The invention relates to an apparatus for weighing in a bird, which hangs from a shackle of known weight carried by a continuously moving overhead conveyor.

In the poultry processing industry it is common practice to weigh the processed birds as they are transported by an overhead conveyor, in order to devide the birds in weight classes, each with a weight range of about 50 gram. After the weight of the birds is established, they are automatically released from the conveyor shackles as they pass a series of receiving bins corresponding with the different weight classes. Apart from grading or sizing the birds it is also desirable to weigh the birds during the different stages of processing in order to establish and control yield losses and/or water pick-up.

In a known apparatus for weighing birds each conveyor shackle is provided with a special pivotable link with a pair of rollers, which when the shackle passes a weighing station are guided onto a pair of rails spaced below the conveyor track. The first part of these rails slopes upwards, so that the link gradually pivots backwards and the full weight of the bird and the shackle becomes solely supported by the rollers. The rollers then pass a weighing bridge fitted into a gap in the rails and supported by a load cell or another weighing element, which measures the total weight supported by the rollers as they pass the weighing bridge. The length of the weighing bridge is limited to less than the distance between subsequent shackles, which in practice would be 6 inches or about 15 cm.

The main problem with an apparatus of this kind is that due to friction in the rollers and friction between the rollers and the rails, the conveyor still has to apply a substantial force on the link in order to drag the shackle over the bridge. Since these frictions vary from shackle to shackle and with the conveyor speed, this dragging force is not a constant and therefor has a detrimental influence on the accuracy of the measurements, especially when after some time the rollers are worn and when conveyor speeds of 6000–12000 birds per hour are used, which is not exceptional in practice.

Another problem is that an apparatus of the known type can only be used in combination with special shackles with rollers. Apart from being expensive these shackles can not be used during certain stages of the total process. In the defeathering department such shackles would be damaged by the defeathering machines and weighing the birds would be impossible.

SUMMARY OF THE INVENTION

It is therefor the principal object of the invention to solve the problems mentioned and to provide an apparatus for weighing birds carried by an overhead conveyor, with greater accuracy, which may be used with at least the majority of the existing types of shackles.

According to the invention this object is realized by moving a pick-up member along in synchronisation with the overhead conveyor during part of its path, additionally moving the pick-up member relative to the conveyor in order to grip and lift the shackle completely free, so that it is no longer connected with the conveyor, transmitting without friction or any substantial relative movement to a measuring device the force exerted on the pick-up member by the weight of the shackle and the bird it carries for measuring this force, and finally releasing the shackle again. Since the shape of the pick-up member may be adapted to the shape of the shackle, the pick-up member could be used in combination with almost any existing type of shackle. Furthermore, since the pick-up member moves along with the conveyor, no special rollers are necessary and all relative movement between the shackle and the pick-up member, which could cause friction and dragging, is eliminated.

The apparatus for weighing a bird hanging from a shackle of a continuously moving overhead conveyor according to the invention, is provided with at least one pick-up member co-operating with a load cell or another weighing element, and adapted for gripping and lifting a conveyor shackle completely free, so that it is no longer connected with the conveyor, while at the same time moving along in synchronization with the conveyor. The advantage of the apparatus according to the invention is that, since when the shackle and the bird carried thereby are weighed, there is no relative movement between the shackle and the pick-up member, no friction is created and no drag will occur, which would affect the accuracy of the measurement, and obviously the shackle does not have to be equiped with special rollers.

Preferably the pick-up member consists of a pivotable balance arm, radially extending from and rotating about a central vertical shaft, the outer end of the arm being adapted to grip and lift the shackle completely free, whereas the inner end of the balance arm is adapted to bear on the weighing element, which is located in the axis of the central shaft. The advantage of using a radially extending pivotable balance arm, which rotates about a central shaft is that, whereas the outer end of the arm moves along with the same speed as the conveyor, the inner end thereof hardly moves relative to the weighing element, so that no friction, dragging or bumping is caused, which would affect the accuracy of the measurement.

Advantageously the pivot point of the balance arm is supported by a slide block, which is slidably mounted on a vertical guide means rotating about the central shaft. This has the advantage, that the shackle may be lifted by sliding the slide block upwards, so that, when lifting the shackle, the inner end of the balance arm does not have to move downwards and may retain its position relative to the weighing element, without having to move the element.

Preferably a locking element is provided for each balance arm, which prevents the inner end of the balance arm from bearing on the weighing element, until the pivot point of the balance arm and the shackle carried by the balance arm are stabilized. This has the advantage, that no pressure is exerted on the weighing element during the lifting of the shackle and only the actual weighing has to take place during the relatively short period of time during which the conveyor covers the distance between subsequent shackles.

BRIEF DESCRIPTION OF THE DRAWING

Further objects, features and advantages of the invention will become apparent from the following description of an embodiment of the invention, taken in connection with the accompanying drawing, which shows a side view of a weighing apparatus according to the invention, partially in cross section.

DETAILED DESCRIPTION OF A PREFERED EMBODIMENT

The apparatus for weighing birds shown in the drawing has a frame 1 and a vertical discontinuous non-rotating central shaft, consisting of an upper shaft 2 and a lower shaft 3. On the upper shaft 2 a horizontal circular support 4 is rotatably mounted by means of bearings 5, and similarly a horizontal support 6 is rotatably mounted on the lower shaft 3 by means of bearings 7.

The supports 4 and 6 are interconnected by a plurality of pairs of vertical guide bars 8, evenly spaced about the circumference of the supports. The lower and upper ends of each pair of guide bars 8 are held by mounting blocks 9, which are bolted or otherwise attached to the supports 4 and 6. On each pair of guide bars 8 a slide block 10 is slidably mounted.

Each slide block 10 is provided with a follower roller 11 mounted on the back surface of the block and bearing on a stationary camtrack 12, which is supported by a circular plate 13 attached to the upper end of the lower shaft 3, directly over the support 6, by means of a nut 14. The roller 11 is pressed down onto the camtrack 12 by springs 15, mounted on the guide bars 8 between the the slide block 10 and the upper support 2.

Each slide block 10 further supports a balance arm 16 freely pivotable about a horizontal shaft 17 mounted in the slide block 10. The inner end of the balance arm 16 is provided with a vertical pressure tip 18, adapted to be brought to bear on the pressure sensitive bearing surface of a load cell 19 or another force measuring device, which is attached to the lower end of the upper shaft 2. The load cell 19 is connected to an indicator, counter, computer or other data processing device by means of a cable running through an appropriate bore in the upper shaft 2.

For each balance arm 16, a vertical locking pin 20 is slidably mounted in a corresponding bore in the upper support 4. On the upper part of the pin 20 a spring 21 is mounted between the upper support 4 and the head 22 of the locking pin. The spring 21 urges the head 22 upwards against a stationary camtrack 23 supported by a flange 24 attached to the upper shaft 2. The lower end of the locking pin 20 is adapted to bear on the upper surface of the balance arm 16 at a point between the pivot point 17 and the tip 18 of the arm, in order to keep the tip 18 slightly spaced from the load cell 19.

The outer end 25 of the balance arm 16 is adapted to support a conveyor shackle 26 from which a bird 27 hangs by one or both ankle joints. In practice many different types of conveyor shackles are used, so the shape of the outer end 25 of the arm 16 has to be adapted to accomodate the type of shackle, which is actually used. In the embodiment shown in the drawing the outer end 25 of the arm 16 is forked and notched to receive the lower rim of the eye 28 of the shackle 26 on both sides of the stem of the shackle.

The shackle eye 28 is held in a similar eye of a so called drop rod 30, the upper end of which is attached to a trolley 31 of the overhead conveyor. The trolley is attached to a pulling cable 32 or chain and is provided with trolley wheels 33 running on a conveyor track 34, which for about 180° is concentric with the central shaft 2,3 and fastened to the frame 1.

The upper rim 35 of the support 4 is provided with notches regularly spaced with the same distance as the tolleys 31 and adapted to receive the conveyor trolleys, so that as the conveyor moves, the upper support 4 is rotated about the upper shaft 2 by the conveyor. As the upper support is driven by the conveyor, the lower support and the balance arms 16 supported by the slide blocks 10 on the guide bars 8, will also rotate about the central shaft 2,3 and thus move along in synchronisation with the conveyor.

The apparatus hereinbefore described operates as follows: As a bird carried by the overhead conveyor tangentially approaches the apparatus, the stem of the shackle 26 will be caught below the eye 28 in the forked outer end 25 of a balance arm 16 as the slide block 10 supporting the balance arm 16 is in its lowermost position on the guide bars 8. At the same time the trolley 31 from which the shackle 26 depends will be received within a corresponding notch of the support 4. As the conveyor moves on, the slide block 10 is moved upwards by the camtrack 12 and at the same time the camtrack 23 allows the locking pin 20 to slide upwards as well in its bore in the support 4. The shape of the camtracks 12 and 23 are so chosen, that the spacing between the tip 18 of the balance arm 16 and the load cell 19 remains the same. As the slide block 10 moves upwards the lower rim of the shackle eye 28 will come to rest in the notches of the outer end 25 of the balance arm 16, if necessary aided by an outlying stationary guide bar attached to the frame 1, and as the slide block 10 continues its upwards movement the shackle eye 28 will be lifted free from the drop rod eye 29, so that the full weight of the shackle 26 and the bird 27 will be completely supported by the balance arm 16 without drag or friction. The roller 11 of the slide block 10 has now reached a level part of the camtrack 12, so the slide block remains stationary relative to the guide bars 8. After the shackle 26 and the slide block 10 have become completely stable, the head 22 of the locking pin 20 reaches a recess in the camtrack 23, so that the locking pin 20 releases the balance arm 16 and the tip 18 comes to bear on the load cell 19. Since the tip almost lies in the center line of the shaft 2,3 there is hardly any movement between the tip 18 and the load cell. Any friction which may occur between the tip 18 and the load cell will cause no drag so it will not influence the accuracy of the measurement, even if it would not be negligible.

Before the conveyor has traveled over the distance between subsequent trolleys 31 the locking pin 20 moves down again to lock the inner end of the balance arm. After the slide block 10 and the pin 20 are moved back to their initial positions releasing the shackle 26, which will then be removed from the apparatus by the conveyor.

It will be clear that the weight of the bird may be derived from the output signal of the load cell 19 if the weight of the empty shackle is known. Although it is perfectly possible to use shackles of exactly the same weight it would be more accurate to use a second weighing apparatus for weighing the empty shackles.

It will be understood that the embodiment of the invention hereinbefore described with reference to the drawing is merely given as an example, and that within the scope of the invention a number of modifications would be possible.

It would for instance be possible to locate the load cell on the plate 13, in which case pull would be measured rather than pressure, or to place the load cell on top of the frame 1, in which case the tip 18 of the balance arm 16 would come to bear on a force transmitting element received in a bore of the shaft 2.

It would further be possible to lock and release the balance arm 16 by other means. Instead of the locking pin 20 a blocking support could be mounted on the outer face of the slide block 10, which would limit the downward movement of the outer end of the balance arm 16. In that case the slide block 10 would have to be raised over an additional short distance to bring the tip 18 of the balance arm 16 into contact with the load cell and to release the balance arm 16.

Although in the drawing only a single weighing unit is shown, it will be understood that in practice the apparatus will have a number of weighing units regularly spaced about its circumference at points corresponding with the notches in the upper support 4 and the spacing of the trolleys 31 of the conveyor.

Although the apparatus according to the invention has been described in combination with a conveyor shackle with a drop rod 30, several types of shackles used in practice are made in one piece. Even with such so called rigid shackles, the apparatus could be used if sufficient play is created in the connection between the trolley and the shackle to make it possible to lift the shackle free from the support of the conveyor.

Finally it should be noted that although the apparatus according to the invention was described in connection with weighing birds, the method and apparatus could be used for weighing any object being transported by an overhead conveyor, and that such other applications would be well within the scope of the invention.

I claim:

1. Method for weighing birds, which hand from shackles of known weight carried by a continuously moving overhead conveyor, comprising the steps of:
   moving a pick-up member along in synchronization with said conveyor during part of its path;
   additionally moving said pick-up member relative to said conveyor, so that it will lift up a said shackle and disconnect it completely from said conveyor;
   transmitting, without any substantial relative movement or friction, to a load cell or other measuring device the force exerted on said pick-up means by the combined weights of said shackle and the bird it carries, for measuring said force; and
   finally releasing said shackle again to reconnect it with said conveyor.

2. Apparatus for weighing birds, which hang from shackles of known weight carried by a continuously moving overhead conveyor, comprising:
   a frame;
   pick up means movably supported within said frame;
   first moving means for moving said pick-up means along in synchronisation with said conveyor during part of its path;
   second moving means for additionally moving said pick-up means relative to said conveyor, for gripping and lifting a said shackle to disconnect said shackle completely from said conveyor;
   a load cell or other weighing device supported by said frame;
   means for transmitting, without any substantional relative movement or friction, to said load cell the force exerted by the combined weights of said shackle and the bird it carries, for measuring said force; and
   means for finally releasing said shackle to reconnect it with said conveyor.

3. Apparatus according to claim 2 in which said pick-up means comprise at least one pivotable balance arm, radially extending from and supported for rotation about the vertical center line of said frame, the outer end of said balance arm being adapted for gripping and lifting free said shackle, and the inner end of said balance arm being adapted for coming to bear on said load cell, which is located in said center line.

4. Apparatus according to claim 3, further comprising locking means for preventing said inner end of said balance arm from bearing on said load cell until said shackle is stabilized on said outer end of said balance arm and the same force is to be measured.

5. Apparatus according to claim 3, in which said balance arm is pivotably supported at a point intermediate its ends by a slide block, which is slidably mounted on a vertical guide means rotating about said center line.

6. Apparatus according to claim 5, in which said second moving means comprises a follower on said slide block and co-operating with a stationary cam track for moving said slide block and said balance arm up and down, for lifting and releasing said shackle.

* * * * *